US008449313B2

(12) United States Patent
Suzuki et al.

(10) Patent No.: US 8,449,313 B2
(45) Date of Patent: May 28, 2013

(54) CONNECTOR AND CONNECTOR ASSEMBLY

(75) Inventors: Masakazu Suzuki, Yokkaichi (JP);
Toshikazu Sakurai, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 103 days.

(21) Appl. No.: 13/206,572

(22) Filed: Aug. 10, 2011

(65) Prior Publication Data
US 2012/0057928 A1 Mar. 8, 2012

(30) Foreign Application Priority Data
Sep. 3, 2010 (JP) ................................. 2010-197649

(51) Int. Cl.
*H01R 13/627* (2006.01)
(52) U.S. Cl.
USPC .......................................................... 439/357
(58) Field of Classification Search
USPC ................. 439/345, 347–358, 298, 832, 904, 439/910, 923; 24/614–615
See application file for complete search history.

(56) References Cited

U.S. PATENT DOCUMENTS

| 4,925,398 | A | 5/1990 | Samejima et al. |
| 5,203,715 | A | 4/1993 | Yamamoto |
| 6,579,113 | B2 * | 6/2003 | Kodama ......................... 439/358 |
| 6,712,635 | B1 * | 3/2004 | Nimura .......................... 439/352 |
| 7,011,536 | B2 * | 3/2006 | Okamoto et al. ............. 439/157 |
| 2005/0082840 | A1 | 4/2005 | Ichida et al. |

FOREIGN PATENT DOCUMENTS

| EP | 1703599 A1 | 9/2006 |
| JP | 2008-130324 | 6/2008 |

* cited by examiner

*Primary Examiner* — Edwin A. Leon
(74) *Attorney, Agent, or Firm* — Gerald E. Hespos; Michael J. Porco; Matthew T. Hespos

(57) ABSTRACT

In the process of connecting two housings (10, 30), a lock arm (36) is resiliently deformed in an unlocking direction crossing a connecting direction of the two housings (10, 30) by sliding in contact with a guiding surface (17) of a lock portion (16). The guiding surface (17) includes a first guiding surface (17A) arranged in a front area in the connecting direction to the second housing (30) and a second guiding surface (17B) arranged in an area behind the first guiding surface (17A) in the connecting direction to the second housing (30) and having a steep area (22) whose angle of inclination with respect to the connecting direction of the two housings (10, 30) is larger than that of the first guiding surface (17A).

15 Claims, 9 Drawing Sheets

CONNECTOR AND CONNECTOR ASSEMBLY

BACKGROUND OF THE INVENTION

1. Field of the Invention

The invention relates to a connector and to a connector assembly.

2. Description of the Related Art

Japanese Unexamined Patent Publication No. 2008-130324 discloses a connector with first and second housings that are connectable with one another. The first housing has a lock and the second housing has a resiliently deformable lock arm. The lock arm interferes with the lock in the process of connecting the two housings and deforms resiliently. The lock arm resiliently returns and engages the lock when the housings reach a properly connected state to lock the housings in the connected state.

The lock has a guiding surface that is inclined with respect to a connecting direction of the two housings, and the lock arm is deformed by sliding in contact with the guiding surface in the process of connecting the housings. An operating portion formed on the lock arm can be pressed to deform the lock arm and to disengage the lock arm from the lock for unlocking the two housings.

An operator may press the operating portion mistakenly while holding the second housing during a connecting operation. Thus, the lock arm could be deformed at the start of a connecting operation. In this case, the operating portion is not pressed intentionally for unlocking and a deformed amount of the lock arm is likely to be smaller than a deforming amount necessary for unlocking. Hence, the lock arm contacts an intermediate part of the guiding surface during the connecting operation.

The lock arm continues to slide in contact with the guiding surface and deforms further as the connecting operation proceeds and then resiliently returns when the connection is complete. The resiliently deforming amount of the lock arm during this sliding contact with the guide surface is smaller than the resiliently deforming amount when the connecting operation is started properly and without the lock arm being partially deformed. Thus, a variation of connection resistance resulting from the resilient deformation of the lock arm also is small when the lock arm is partially deformed at the start of the connection operation. The operator feels the progress of the connecting operation based on the variation of the connection resistance resulting from the resilient deformation of the lock arm. The progress of the connecting operation can be judged better when the variation of the connection resistance is large.

Japanese Unexamined Patent Publication No. 2008-130324 discloses a connector where a variation of connection resistance is small if the lock arm is deformed partially at the start of a connecting operation and thus provides a poor operation feeling.

The present invention was developed in view of the above situation and an object thereof is to provide good operation feeling even when a connecting operation is performed with a lock arm left resiliently deformed.

SUMMARY OF THE INVENTION

The invention relates to a connector with a first housing that is connectable along a connecting direction to a second housing of a mating connector. The first housing has a lock and the second housing has a lock arm. The lock has a guiding surface inclined with respect to the connecting direction of the housings. The guiding surface is disposed to interfere with the lock arm during a connecting operation. The lock arm sides in contact with the guiding surface during a connecting operation and deforms resiliently in an unlocking direction that crosses the connecting direction of the housings. The guiding surface includes a first guiding surface in a front area in the connecting direction to the second housing and a second guiding surface in an area behind the first guiding surface in the connecting direction to the second housing. The second guiding surface defines a steep area that has an angle of inclination with respect to the connecting direction of the two housings that exceeds an angle of inclination of the first guiding surface.

An upper surface of the lock preferably is a substantially flat surface that is parallel to the connecting direction.

The angle of inclination of the first guiding surface with respect to the connecting direction preferably is less than about 45°.

A front end of the second guiding surface preferably is connected directly to the rear end of the first guiding surface and/or a rear end of the second guiding surface is connected directly to an upper surface of the lock.

The second guiding surface may comprise a steep slant and an arcuate or bent surface. The arcuate or bent surface may have a steeply curved surface and a moderately curved surface. The steeply curved surface may be an area of the arcuate surface where an angle of inclination of a tangent to the steeply curved surface with respect to the connecting direction exceeds the inclination angle of the first guiding surface.

A curvature of the steeply curved surface preferably is constant over the entire area of the steeply curved surface and the front of the steeply curved surface preferably is connected tangentially to the steep slant.

The moderately curved surface may be an area of the arcuate surface where an angle of inclination of a tangent to the moderately curved surface with respect to the connecting direction is smaller than the inclination angle of the first guiding surface.

A curvature of the moderately curved surface preferably is constant over the entire area of the moderately curved surface and/or equal to that of the steeply curved surface.

A front end of the moderately curved surface preferably is connected tangentially to the rear end of the steeply curved surface. A rear end of the moderately curved surface preferably is connected tangentially to the upper surface of the lock.

The invention also relates to a connector assembly comprising the above-described connector and a mating connector that connect along a connecting direction. The mating connector has the second housing and a lock arm is provided on the second housing. The lock arm is resiliently deformable in a direction crossing the connecting direction. The lock arm resiliently returns toward a lock position to engage the lock when the two housings reach a properly connected state thereby locking the housings together.

An operating portion preferably is formed on the lock arm and can be pressed to deform the lock arm resiliently in the unlocking direction for disengagement from the lock so that the housings can be unlocked.

A slide-contact area of the second guiding surface with the lock arm in the process of connecting the two housings is only a steep area.

The lock arm may have a locking hole or recess. A part of the lock arm before the locking hole or recess defines a slide-contact portion, and a rear surface of the slide-contact portion defines a locking surface substantially perpendicular to the connecting direction.

An angle of inclination of a slide-contact slant of the slide-contact portion with respect to the connecting direction is larger than the angle of inclination of the first guiding surface and/or is smaller than the angle of inclination of the steep slant when the lock arm is at a lock position. The angle of inclination of the slide-contact slant preferably is less than about 50°.

If a connecting operation is performed with the operating portion pressed and the lock arm resiliently deformed, the lock arm contacts the second guiding surface without touching the first guiding surface. The second guiding surface has a relatively large angle of inclination with respect to the connecting direction of the two housings. Thus, connection resistance suddenly increases due to the contact of the lock arm with the second guiding surface and also in the process of the lock arm sliding in contact with the second guiding surface. An operator can clearly feel the progress of the connecting operation by this sudden variation of the connection resistance so that a good operation feeling is obtained even when the connecting operation starts with the lock arm resiliently deformed.

If the two housings are connected without the lock arm being resiliently deformed, the lock arm slides in contact with the first guiding surface and, thereafter, slides in contact with the second guiding surface to increase a resiliently deforming amount. A good operation feeling also is obtained in this case since the connection resistance suddenly increases when the lock arm slides in contact with the second guiding surface.

A front upper surface of the lock that faces the second housing during the connecting operation is oblique to the connecting direction of the two housings and defines the guiding surface. Areas with which the lock arm does not come into direct contact in the process of connecting the two housings also are included in the guiding surface.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

Figure 1:
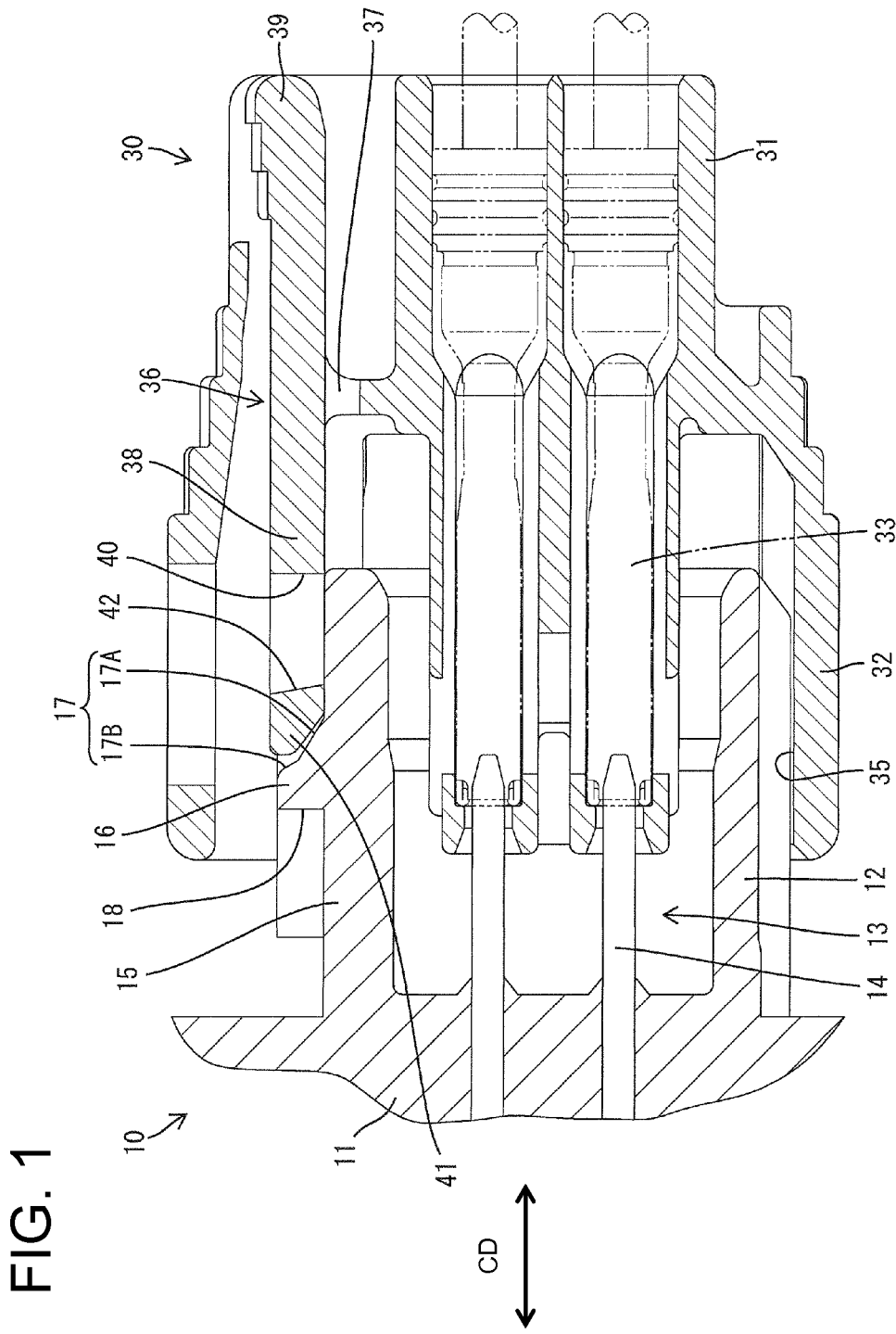
FIG. 1 is a section showing an intermediate state of a connecting operation of a first housing and a second housing in one embodiment.

A connector in accordance with the invention is illustrated in FIGS. 1 to 9 and includes first and second housings 10 and 30 that are connectable to one another.

As shown in FIGS. 1 to 3, 6 and 7, the first housing 10 includes a terminal holding portion 11 and a substantially rectangular tubular receptacle 12 extending from the upper periphery of the front end (right end in FIGS. 1 to 3) of the terminal holding portion 11. Male terminal fittings 13 are held in the terminal holding portion 11, and tabs 14 at the leading ends of the terminal fittings 13 project forward from the terminal holding portion 11 to be at least partly surrounded by the receptacle 12.

The receptacle 12 is made of four plates, including an upper plate 15 with a flat upper surface that is parallel to a connecting direction CD of the two housings 10, 30. A lock 16 projects unitarily up from the upper surface of the upper plate 15. A guiding surface 17 is formed on the front (right surface in FIGS. 1 to 5) of the lock 16 and a lock surface 18 on the rear (left surface in FIGS. 1 to 5) of the lock 16 is aligned substantially perpendicular to the connecting direction CD. An upper or upper surface 19 of the lock 16 is substantially flat and parallel to the connecting direction CD.

Figure 4:
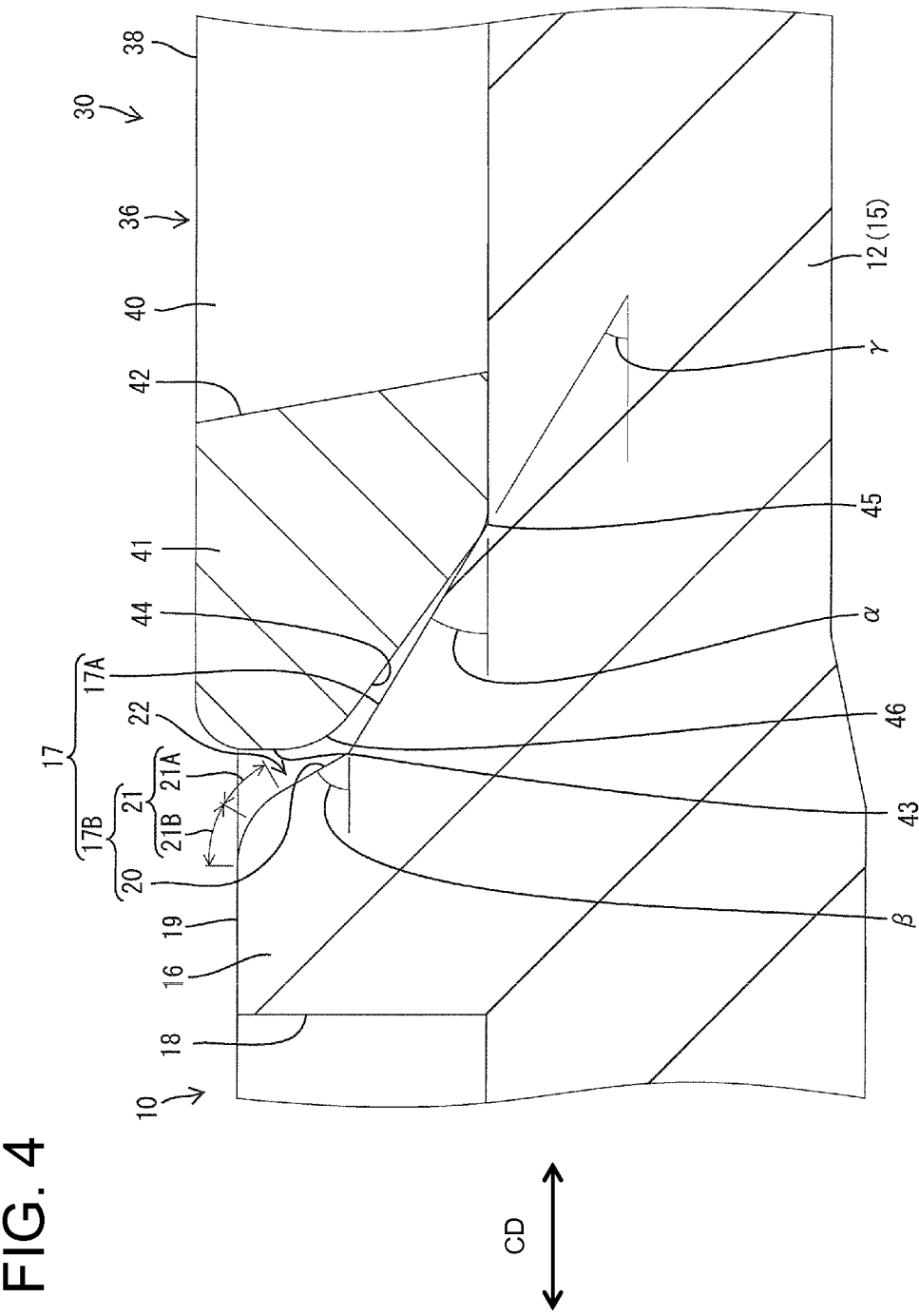
FIG. 4 is a partial enlarged view of FIG. 1.
Figure 5:
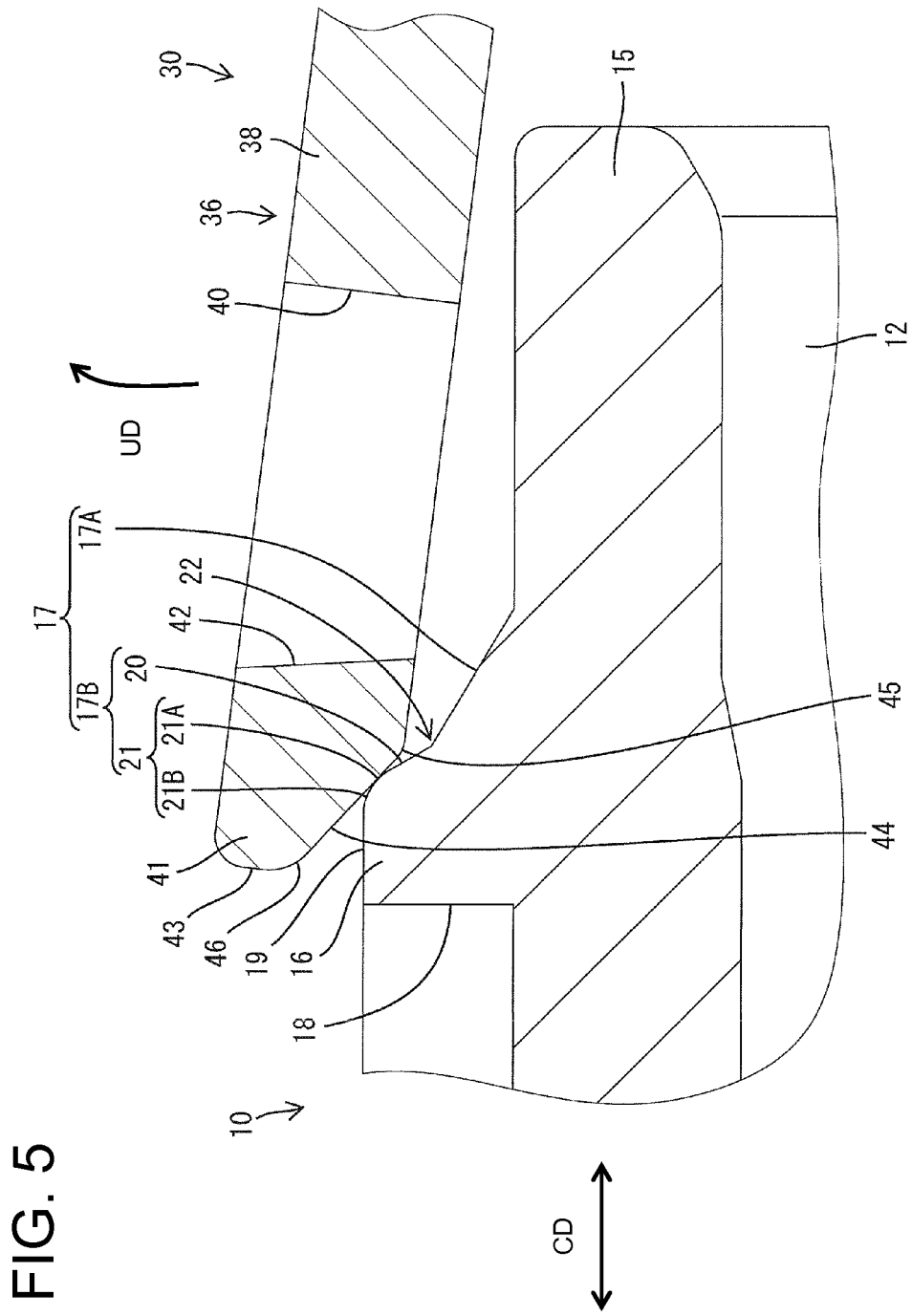
FIG. 5 is a partial enlarged view of FIG. 2.
Figure 6:
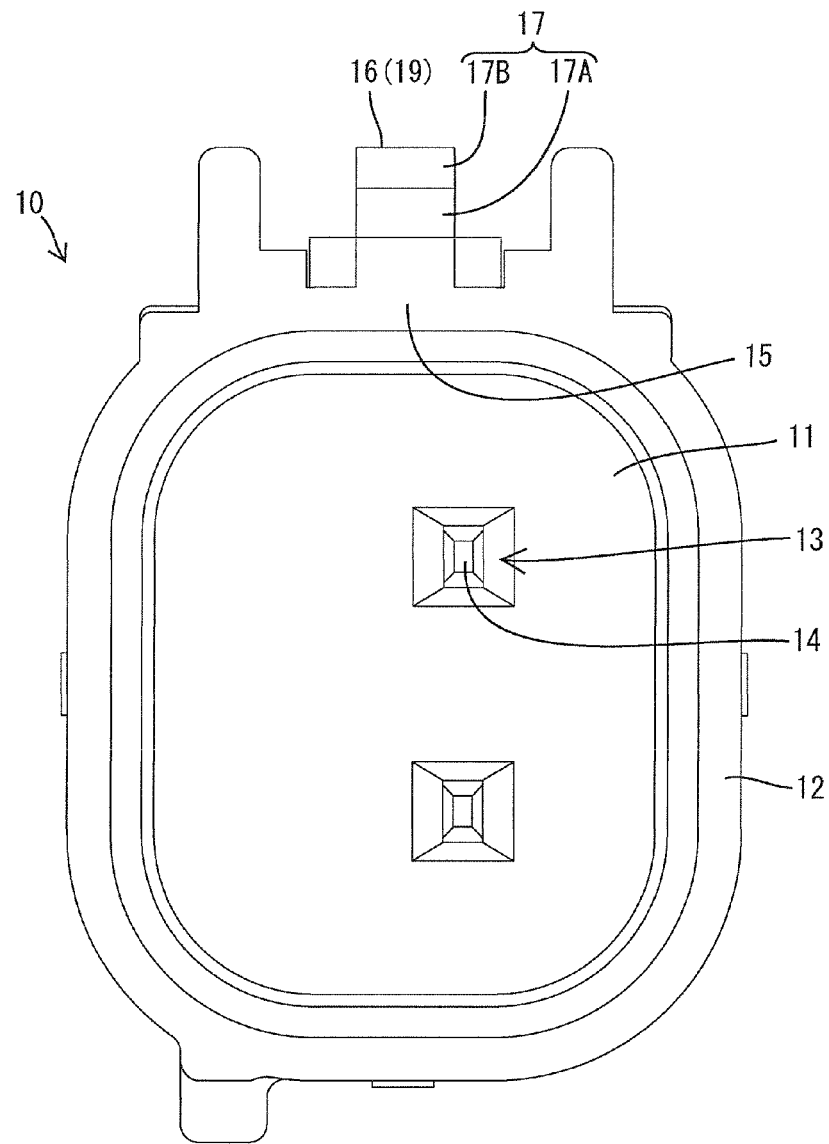
FIG. 6 is a front view of the first housing.
Figure 7:
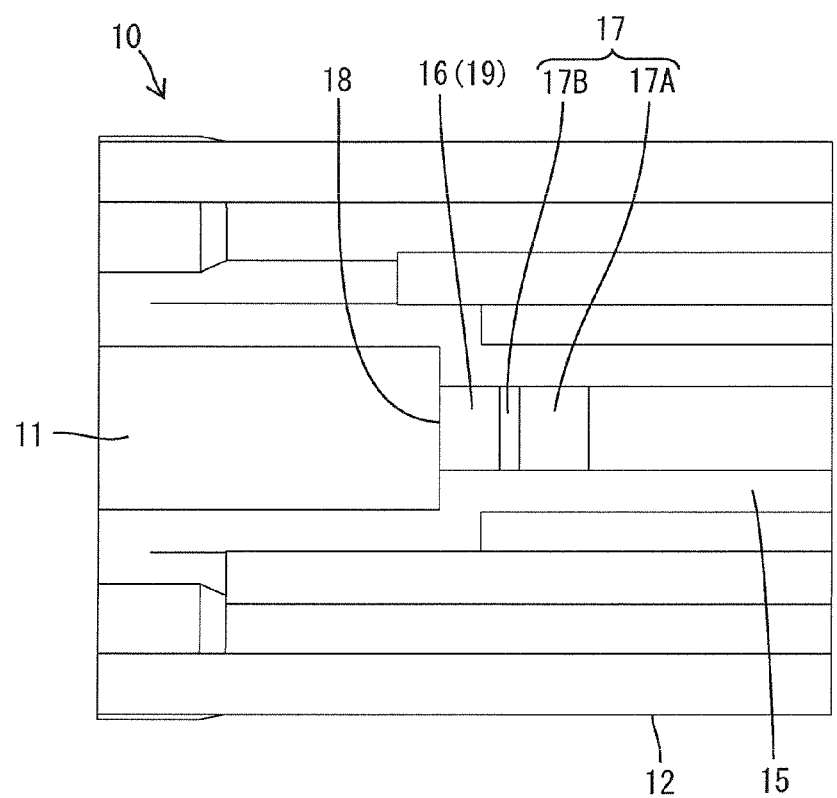
FIG. 7 is a plan view of the first housing.
Figure 8:
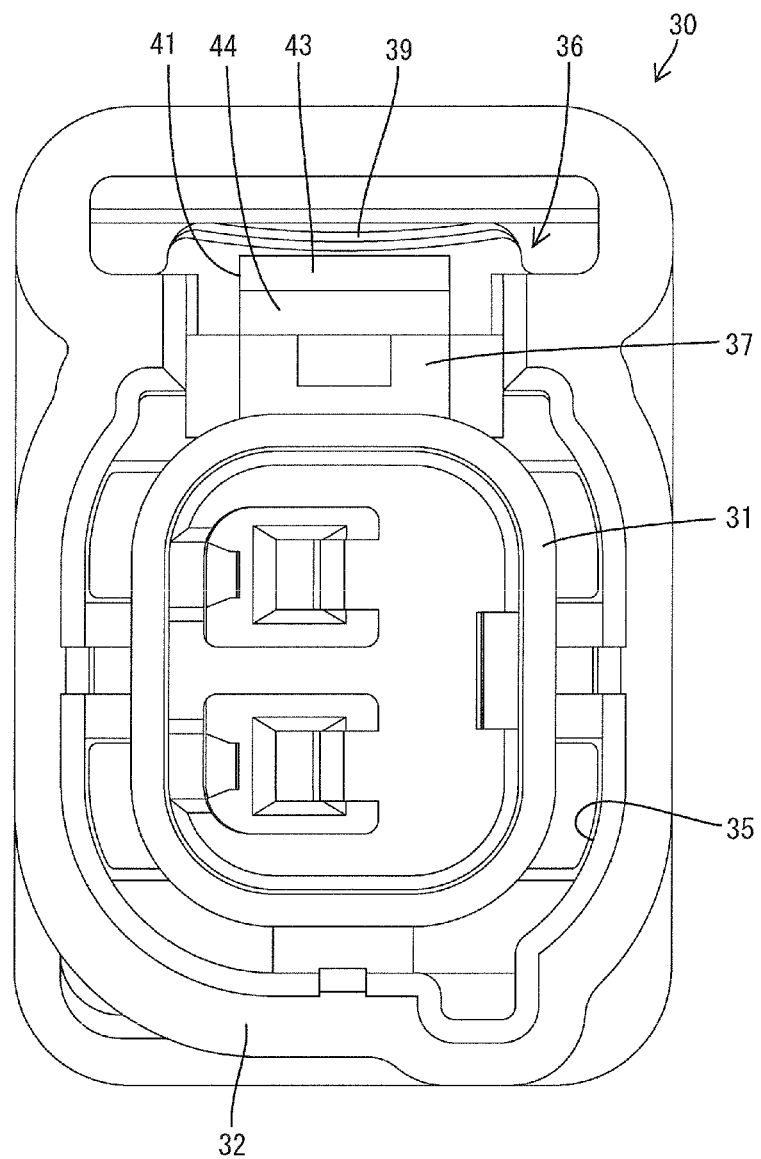
FIG. 8 is a front view of the second housing.
Figure 9:
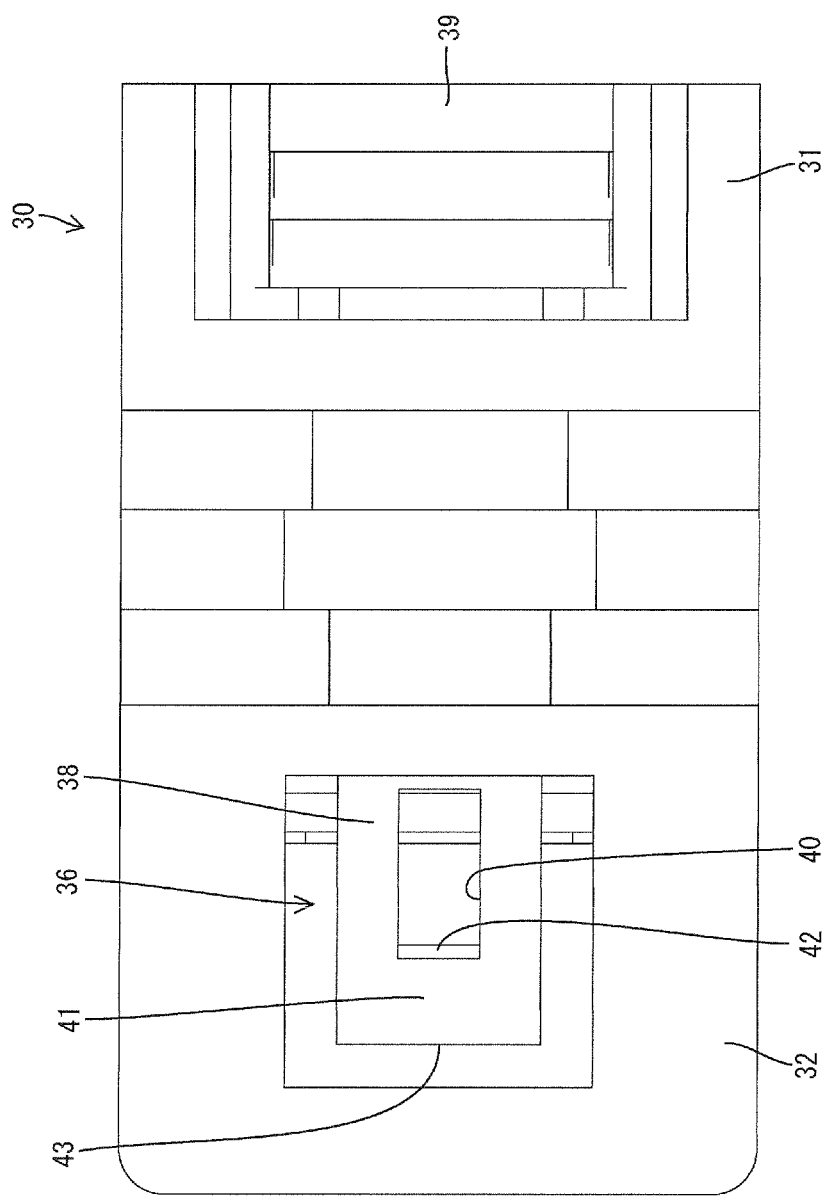
FIG. 9 is a plan view of the second housing.

As shown in FIGS. 4 and 5, the guiding surface 17 comprises first and second guiding surfaces 17A and 17B. The first guiding surface 17A is substantially flat and is formed in a front area of the guiding surface 17 in the connecting direction CD to the second housing 30 (right area in FIGS. 4 and 5) and is aligned to the connecting direction CD at an angle of inclination a that is less than about 45° (particularly about 30° in this embodiment). A projecting distance of the first guiding surface 17A in a vertical or outward direction is less than about ⅔ (particularly about ½) of the entire projecting distance of the lock 16. The front end of the first guiding surface 17A extends from the upper plate 15 of the receptacle 12 at an obtuse angle.

The second guiding surface 17B is behind the first guiding surface 17A in the connecting direction CD to the second housing 30. The front end of the second guiding surface 17B is connected directly to the rear end of the first guiding surface 17A and the rear end of the second guiding surface 17B is connected directly to the upper surface 19 of the lock 16. The second guiding surface 17B has a steep area 22 with an angle of inclination β with respect to the connecting direction CD larger than the angle α of the first guiding surface 17A. More particularly, the second guiding surface 17B is composed of a steep slant 20 and an arcuate surface 21.

The steep slant 20 is a flat surface with an angle of inclination β with respect to the connecting direction CD that exceeds the angle of inclination α of the first guiding surface 17A. More particularly, the angle of inclination β of the steep slant 20 is more than about 45° (particularly about 60° in this embodiment). The front end of the steep slant 20 is connected at an obtuse angle to the rear end of the first guiding surface 17A, and an area of the guiding surface 17 where the first guiding surface 17A and the steep slant 20 are formed is indented. A formation area or projecting distance of the steep slant 20 in the vertical direction is more than about ⅓ (particularly about ½) of the entire height area of the second guiding surface 17B.

The arcuate surface 21 is composed of a steeply curved surface 21A and a moderately curved surface 21B. The steeply curved surface 21A is an area of the arcuate surface 21 where an angle of inclination of a tangent (not shown) to the steeply curved surface 21A with respect to the connecting direction is larger than the angle of inclination α of the first guiding surface 17A. A curvature of the steeply curved surface 21A is constant over the entire area of the steeply curved surface 21A and the steep slant 20 is tangent to the front end of the steeply curved surface 21A.

The moderately curved surface 21B is an area of the arcuate surface 21 where an angle of inclination of a tangent (not shown) to the moderately curved surface 21B with respect to the connecting direction CD is smaller than the angle of inclination α of the first guiding surface 17A. A curvature of the moderately curved surface 21B is constant over the entire area of the moderately curved surface 21B and/or equal to the curvature of the steeply curved surface 21A. The front end of the moderately curved surface 21B is tangent to the rear end of the steeply curved surface 21A, and the upper surface 19 of the lock 16 is tangent to the rear end of the moderately curved surface 21B.

As described above, the area of the second guiding surface 17B including the steep slant 20 and the steeply curved surface 21A is a steep area 22 with an angle of inclination β with respect to the connecting direction CD that exceeds the angle of inclination (α) of the first guiding surface 17A. In the process of connecting the two housings 10, 30, a slide-contact area of the second guiding surface 17B with the lock arm 36 is only the steep area 22.

The guiding surface 17 of the lock 16 faces the second housing 30 during the connecting operation and is oblique to the connecting direction CD. The guiding surface 17 includes areas that do not contact the lock arm 36 in the process of connecting the two housings 10, 30.

As shown in FIGS. 1 to 3, 8 and 9, the second housing 30 includes a substantially block-shaped terminal accommodating portion 31 and a tubular fitting 32 extends forward (left in FIGS. 1 to 3) from the upper periphery of the terminal accommodating portion 31 to surround the terminal accommodating portion 31. The terminal accommodating portion 31 is fit into the receptacle 12 when connecting the two housings 10, 30. Female terminal fittings 33 are accommodated in the terminal accommodating portion 31, and entrance openings are formed in the front surface of the terminal accommodating portion 31 for allowing the respective tabs 14 to enter the terminal accommodating portion 31 for connection with the female terminal fittings 33 when the two housings 10, 30 are connected. A forwardly open connection space 35 is formed between the terminal accommodating portion 31 and the tubular fitting portion 32 for receiving the receptacle 12 at the time of connecting the two housings 10, 30.

The lock arm 36 is accommodated in an upper part of the connection space 35 substantially facing the upper surface of the terminal accommodating portion 31 and an upper wall of the tubular fitting 32. The lock arm 36 is unitary with a support 37 projecting up from the upper surface of the terminal accommodating portion 31. An arm portion 38 is cantilevered forward from the upper end of the support 37 and an operating portion 39 is cantilevered back from the upper end of the support 37. The lock arm 36 normally is held at a lock position shown in FIGS. 1, 3 and 4 due to the rigidity of the lock arm 36, and is resiliently deformable in an unlocking direction UD (intersecting the connecting direction CD) substantially like a seesaw with the upper end of the support 37 as a supporting point, as shown in FIGS. 2 and 5.

The arm portion 38 and the operating portion 39 are connected in a straight line and extending directions of the arm portion 38 and the operating portion 39 are substantially parallel to the connecting direction CD when the lock arm 36 is at the lock position. The arm portion 38 and the operating portion 39 are oblique to the connecting direction CD when a front end portion of the arm portion 38 is displaced up and away from the terminal accommodating portion 31 and the operating portion 39 is displaced.

A locking hole 40 vertically penetrates the arm portion 38 of the lock arm 36. A slide contact 41 is defined at the front of the arm portion 38 before the locking hole or recess 40 and near a front end of the receptacle 12. A locking surface 42 faces forward in the locking hole or recess 40 and is substantially perpendicular to the connecting direction CD. A facing surface 43 is defined at an upper area of the front surface of the slide contact 41 and is perpendicular to the connecting direction CD, as shown in FIGS. 4 and 5. A slide-contact slant 44 is formed at a lower area of the front surface of the slide contact 41 and defines a plane inclined to the connecting direction CD. The slide-contact slant 44 and the lower surface of the arm portion 38 (slide contact 41) are at an obtuse angle and are connected via a slide-contact curved surface 45. Further, the slide-contact slant 44 and the facing surface 43 are connected tangentially via an arcuate surface 46.

As shown in FIG. 4, an angle of inclination γ of the slide-contact slant 44 with respect to the connecting direction CD is less than about 50° (particularly about 35° in this embodiment) when the lock arm 36 is at the lock position. The angle of inclination γ of the slide-contact slant 44 exceeds the angle of inclination α of the first guiding surface 17A and is smaller than the angle of inclination β of the steep slant 20 (i.e. maximum angle of inclination in the steep area 22). Further, with the lock arm 36 at the lock position, a formation area of the slide-contact slant 44 in the vertical direction is larger than the formation area of the first guiding surface 17A. Accordingly, as shown in FIG. 4, the upper end of the slide-contact slant 44 is higher than the upper end of the first guiding surface 17A and is at a height corresponding to the steep slant 20 when the lower surface of the arm portion 38 is in contact with or proximately facing the upper surface of the upper plate 15 of the receptacle 12.

Figure 2:
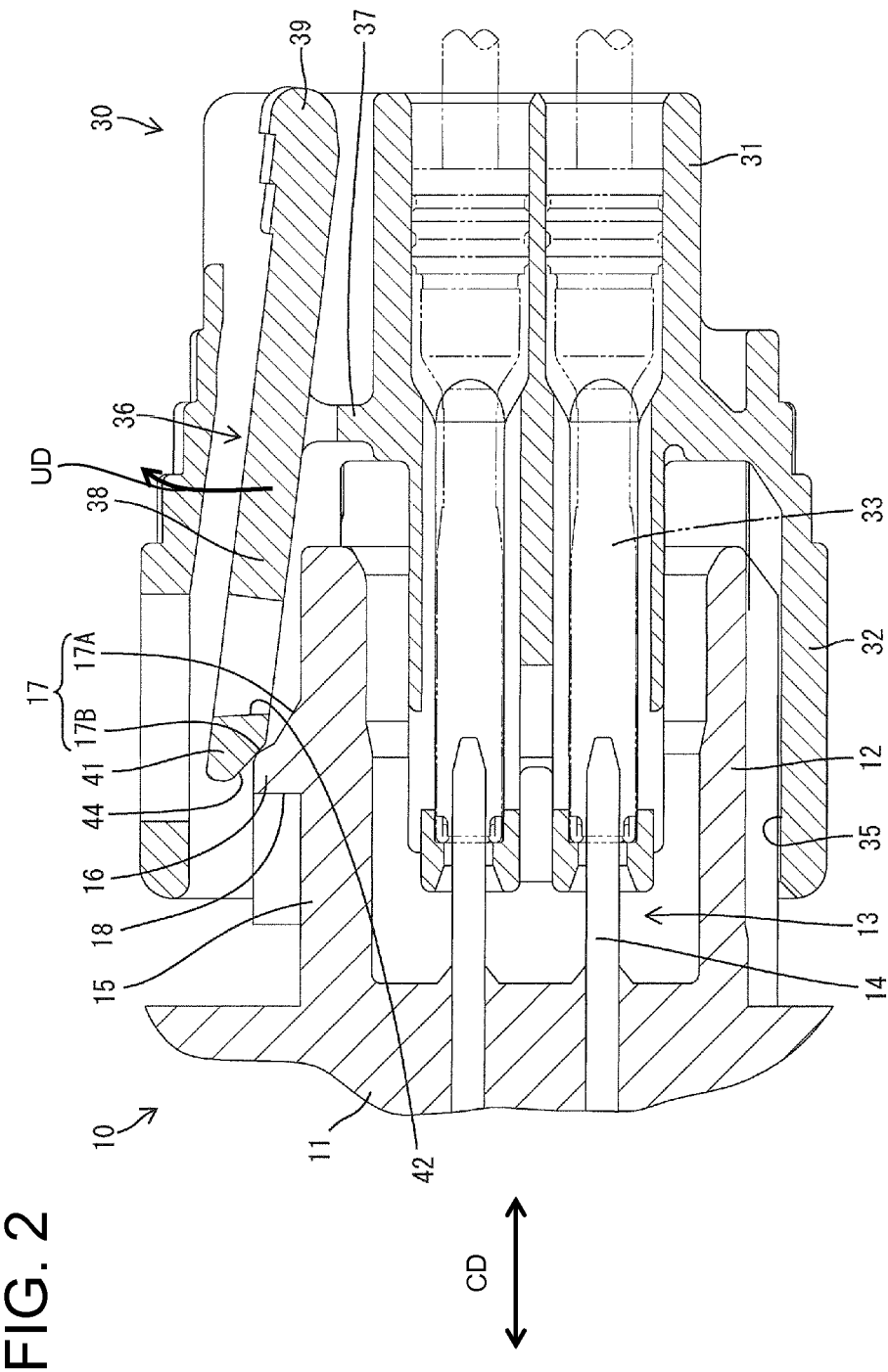
FIG. 2 is a section showing an intermediate state of the connecting operation of the first and second housings advanced from the state shown in FIG. 1.

The slide-contact curved surface 45 or the bottom end of the slide-contact slant 44 contacts the front end (bottom end) of the first guiding surface 17AV, as shown in FIGS. 1 and 4, when the receptacle 12 is fit into the connection space 35 in the process of connecting the two housings 10, 30. At this time, the slide-contact slant 44 does not touch either the first guiding surface 17A or the second guiding surface 17B and is spaced from both guiding surfaces 17A, 17B. Further, the facing surface 43 and the arcuate surface 46 are spaced from the second guiding surface 17B.

The slide-contact curved surface 45 slides in contact with the first guiding surface 17A as the connecting operation progresses. Accordingly, the lock arm 36 is deformed resiliently in the unlocking direction UD. At this time, connection resistance resulting from the contact of the first guiding surface 17A and the slide-contact curved surface 45 is relatively small since the angle of inclination α of the first guiding surface 17A with respect to the connecting direction CD is relatively small. During this time, the arcuate surface 46 approaches the second guiding surface 17B and the angle of inclination of the slide-contact slant 44 with respect to the connecting direction gradually increases.

The slide-contact slant 44 contacts the steeply curved surface 21A when the connecting operation further progresses and the slide-contact curved surface 45 reaches an intermediate part of the first guiding surface 17A. Thereafter, as the connecting operation progresses, the slide-contact curved surface 45 separates from the first guiding surface 17A, the slide-contact slant 44 slides in contact with the steeply curved surface 21A, and the lock arm 36 deforms further in the unlocking direction UD due to the slide contact as shown in FIG. 5. The angle of inclination of the steeply curved surface 21A is larger than the angle of inclination α of the first guiding surface 17A. Thus, connection resistance resulting from the slide contact of the slide-contact slant 44 and the steeply curved surface 21A suddenly increases when a slide-contact area of the lock arm 36 on the guiding surface 17 transitions from the first guiding surface 17A to the steep area 22. A change amount of the resilient deformation of the lock arm 36 also suddenly increases. Thus, connection resistance resulting from a resilient restoring force of the lock arm 36 also suddenly increases. These sudden increases in the connection resistance are good indicators for an operator to sense the progress of the connecting operation.

The slide-contact curved surface 45 slides in contact with the steeply curved surface 21A after the slide-contact slant 44 passes the steeply curved surface 21A. The slide-contact curved surface 45 slides in contact with the moderately curved surface 21B after passing the steeply curved surface 21A. Thereafter, the slide contact 41 of the lock arm 36 slides successively in contact with the moderately curved surface 21B and the upper surface 19 of the lock 16. The angle inclination of the moderately curved surface 21B with respect to the connecting direction CD is relatively small (i.e. smaller than the angle of inclination α of the first guiding surface 17A) and the upper surface 19 of the lock 16 substantially is parallel to the connecting direction CD. Thus, connection resistance resulting from the slide contact of the lock arm 36 is small. Further, since the resiliently deforming amount of the lock arm 36 hardly varies while the slide contact 41 slides in contact with the moderately curved surface 21B and the upper surface 19 of the lock 16, the connection resistance will not increase due to an increase in the resiliently deforming amount of the lock arm 36. Thus, the connecting operation of the two housings 10, 30 progresses at once and the housings 10, 30 reliably reach a properly connected state.

Figure 3:
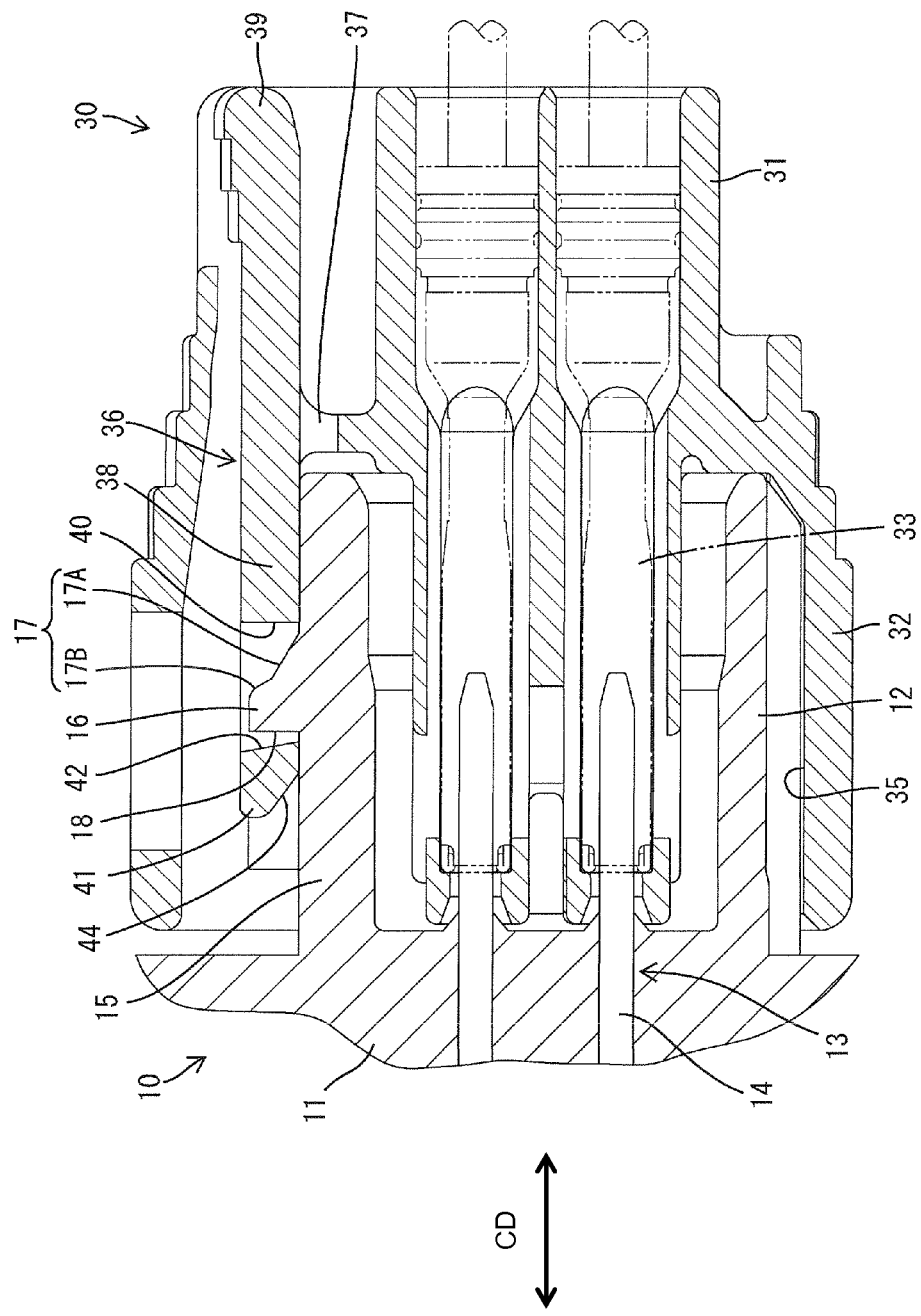
FIG. 3 is a section showing a state where the connecting operation of the first and second housings is completed.

The slide-contact portion 41 completely passes the lock 16 when the two housings 10, 30 reach the properly connected state, as shown in FIG. 3. Therefore, the lock arm 36 resiliently returns to the lock position, the locking hole or recess 40 engages the lock 16, and the lock surface 18 and the locking surface 42 proximately face each other so as to be engageable with each other. This locking action of the lock 16 and the lock arm 36 locks the two housings 10, 30 in the properly connected state.

The locked housings 10, 30 can be separated by pressing the upper surface of the operating portion 19 to resiliently deform the lock arm 36 in the unlocking direction UD thereby bringing the locking hole or recess 40 above the lock 16. The cancellation of the locked state of the lock 16 and the lock arm 36 enables the two housings 10, 30 to be pulled and separated from each other.

The two housings 10, 30 are connected without the operator touching the lock arm 36, i.e. with the lock arm 36 held at the lock position. However, upon connecting the two housings 10, 30, the operator may press the operating portion 19 by mistake to resiliently deform the lock arm 36 in the unlocking direction UD when holding the second housing 30 and may start the connecting operation in this state. In this case, the operating portion 19 is not pressed intentionally for unlocking purpose, the resiliently deforming amount of the lock arm 36 is smaller than necessary for unlocking and the lock arm 36 comes into contact with an intermediate part of the guiding surface 17 during the connecting operation as shown in FIGS. 2 and 5.

That is, the slide-contact slant 44 of the lock arm 36 contact the steeply curved surface 21A of the second guiding surface 17B without touching the first guiding surface 17A. In other words, this steeply curved surface 21A is the area of the guiding surface 17 that the lock arm 36 first contacts. The resiliently deforming amount of the lock arm 36 does not vary until the slide-contact slant 44 contacts the steeply curved surface 21A. Thus, an increase in connection resistance resulting from a variation (sudden increase) of the resilient deforming amount of the lock arm 36 is not felt by the operator.

The connection resistance increases at once when the slide-contact slant 44 contacts the steeply curved surface 21A. More particularly, the angle of inclination of the steeply curved surface 21A with respect to the connecting direction CD is relatively large. Thus, the connection resistance suddenly increases the moment the slide-contact slant 44 slides in contact with the steeply curved surface 21A and also suddenly increases due to the slide contact of the slide-contact slant 44 with the steeply curved surface 21A. Further, the resiliently deforming amount of the lock arm 36 also suddenly increases due to the slide contact of the slide-contact slant 44 and the steeply curved surface 21A. Hence, the connection resistance also suddenly increases due to this increase in the resilient deforming amount.

The operator can clearly feel the progress of the connecting operation (i.e. contact of the lock arm 36 with the lock portion 16 because of these sudden increases in the connection resistance. In this way, good operation feeling can be obtained even when the connecting operation is performed with the lock arm 36 left resiliently deformed.

The invention is not limited to the above described and illustrated embodiment. For example, the following embodiments are also included in the scope of the invention.

The first guiding surface is substantially flat and the angle of inclination thereof with respect to the connecting direction of the two housings is substantially constant over the entire area of the first guiding surface in the above embodiment, the angle of inclination of the first guiding surface may not be constant over the entire area. In this case, the entire or partial area of the first guiding surface may be a curved surface.

The curvature of the arcuate surface of the second guiding surface is substantially constant over the entire area in the above embodiment. However, the arcuate surface may be formed so that the curvature thereof changes in a sliding contact direction of the lock arm (forward and backward directions).

Only a part of the second guiding surface is an arcuate surface and/or the angle of inclination of this arcuate surface with respect to the connecting direction of the two housings gradually changes in the sliding contact process of the lock arm in the above embodiment. However, the entire area of the second guiding surface may be an arcuate surface or a substantially flat surface with a substantially constant angle of inclination. When the entire area of the second guiding surface is an arcuate surface, the curvature may or may not be constant over the entire area of the second guiding surface.

The first guiding surface and the upper surface of the first housing are connected at an obtuse angle in the above embodiment, but they may be connected smoothly by a curved surface.

The guiding surface is formed by connecting the first and second guiding surfaces in the connecting direction of the two housings in the above embodiment. However, the first and second guiding surfaces may be separated at front and rear sides via a surface parallel to the connecting direction of the two housings.

The lock arm slides in contact only with the arcuate surface of the second guiding surface in the process of connecting the two housings in the above embodiment. However, it may slide in contact with both the steep slant and the arcuate surface.

Although the lock portion projects toward the upper surface of the first housing in the above embodiment, it may project in from the plat forming the first housing.

The lock is a projection in the above embodiment. Instead, a part of the plate of the first housing may be cut to penetrate in a thickness direction, and a part of the plate left without being cut may serve as the lock. In this case, the lock is accommodated within the thickness range of the plate.

In the above embodiment, the lock arm is deformed resiliently like a seesaw by forming the arm portion, which contacts the lock, to cantilever from the support toward the first housing and forming the operating portion to cantilever from the support to the side opposite the first housing. However, the lock arm may be formed such that the arm portion, which will contact the lock, cantilevers from the support toward the side opposite the first housing and the operating portion is formed at the extending end of the arm portion.

The angle of inclination of the first guiding surface with respect to the connecting direction is about 30° in the above embodiment, but may be larger or smaller than 30°.

The angle of inclination of the steep slant of the second guiding surface to the connecting direction is about 60° in the above embodiment, but may be larger or smaller than 60°.

The angle of inclination of the slide-contact slant to the connecting direction is about 35° in the above embodiment, but may be larger or smaller than 35°.

Although the slide-contact slant of the lock arm and the lower surface of the arm portion are connected smoothly via the slide-contact curved surface in the above embodiment, they may be connected to each other at an obtuse angle.

What is claimed is:

1. A connector, comprising a first housing connectable along a connecting direction to a second housing of a mating connector and including a lock to engage a lock arm of the second housing; wherein:
   the lock is formed with a guiding surface inclined with respect to the connecting direction of the two housings so that the lock arm is resiliently deformed in an unlocking direction crossing the connecting direction of the two housings by sliding in contact with the guiding surface in the process of connecting the two housings; and
   the guiding surface includes a first guiding surface arranged in a front area in the connecting direction to the second housing and a second guiding surface arranged in an area behind the first guiding surface in the connecting direction to the second housing and having a steep area whose angle of inclination ($\beta$) with respect to the connecting direction of the two housings is larger than an angle of inclination ($\alpha$) of the first guiding surface.

2. The connector of claim 1, wherein an upper surface of the lock substantially is a flat surface parallel to the connecting direction.

3. The connector of claim 1, wherein the angle of inclination ($\alpha$) of the first guiding surface with respect to the connecting direction is less than about 45°.

4. The connector of claim 1, wherein a front end of the second guiding surface is connected directly to the rear end of the first guiding surface and a rear end of the second guiding surface is connected directly to the upper surface of the lock.

5. The connector of claim 1, wherein the second guiding surface comprises a steep slant and an arcuate or bent surface.

6. The connector of claim 5, wherein the arcuate or bent surface comprises a steeply curved surface and a moderately curved surface, the steeply curved surface defining an area of the arcuate surface where an angle of inclination of a tangent to the steeply curved surface with respect to the connecting direction is larger than the inclination angle ($\alpha$) of the first guiding surface.

7. The connector of claim 6, wherein a curvature of the steeply curved surface is constant over the entire area of the steeply curved surface and the front end of the steeply curved surface is connected tangentially to the steep slant.

8. The connector of claim 7, wherein the moderately curved surface is an area of the arcuate surface where an angle of inclination of a tangent to the moderately curved surface with respect to the connecting direction is smaller than the inclination angle ($\alpha$) of the first guiding surface.

9. The connector of claim 8, wherein a curvature of the moderately curved surface is constant over the entire area of the moderately curved surface and equal to the curvature of the steeply curved surface.

10. The connector of claim 8, wherein a front end of the moderately curved surface is tangent to the rear end of the steeply curved surface, and wherein a rear end of the moderately curved surface is tangent to the upper surface (19) of the lock (16).

11. A connector assembly comprising the connector of claim 1 and a mating connector connectable therewith along the connecting direction, wherein:
    a lock arm is provided on the second housing and is resiliently deformable in a direction crossing the connecting direction; and
    the lock arm resiliently returns towards a lock position to be engaged with the lock portion, thereby locking the two housings in a connected state, when the two housings reach a properly connected state.

12. The connector assembly of claim 11, wherein an operating portion is formed on the lock arm to be pressed upon for unlocking the two housings, whereby the lock arm is resiliently deformed in the unlocking direction to be disengaged from the lock portion.

13. The connector assembly of claim 11, wherein in the process of connecting the two housings, a slide-contact area of the second guiding surface with the lock arm is only a steep area.

14. The connector assembly of claim 11, wherein the lock arm has a locking hole or recess, a part of the lock arm before the locking hole or recess defining a slide-contact portion, and a rear surface of the slide-contact portion defining a locking surface substantially perpendicular to the connecting direction.

15. The connector assembly of claims 11, wherein, with the lock arm at a lock position, an angle of inclination ($\gamma$) of a slide-contact slant of the slide-contact portion with respect to the connecting direction is larger than the angle of inclination ($\alpha$) of the first guiding surface and smaller than the angle of inclination ($\beta$) of the steep slant, wherein the angle of inclination ($\gamma$) of the slide-contact slant is less than about 50°.

* * * * *